United States Patent [19]

Brack

[11] 4,176,212

[45] Nov. 27, 1979

[54] RADIATION AND MOISTURE CURABLE COMPOSITIONS AND METHOD OF USE

[75] Inventor: Karl Brack, Holliston, Mass.

[73] Assignee: Design Cote Corporation, Natick, Mass.

[21] Appl. No.: 872,197

[22] Filed: Jan. 25, 1978

[51] Int. Cl.$^2$ ............................................. B05D 3/06
[52] U.S. Cl. .............................. 428/423; 204/159.15; 204/159.19; 260/18 TN; 427/54.1; 428/500; 528/73; 560/26; 560/158
[58] Field of Search ............................ 427/44, 43, 54; 204/159.15; 560/26, 158; 260/18 TN; 528/68, 73; 96/35.1

[56] References Cited

U.S. PATENT DOCUMENTS

| | | | |
|---|---|---|---|
| 3,935,330 | 1/1976 | Smith et al. | 427/54 |
| 4,013,806 | 3/1977 | Volkert et al. | 427/54 |
| 4,024,117 | 5/1977 | Emmons | 528/73 |
| 4,025,407 | 5/1977 | Chang et al. | 427/54 |

*Primary Examiner*—John H. Newsome
*Attorney, Agent, or Firm*—George E. Kersey

[57] ABSTRACT

Coating compositions which are curable by simultaneous or sequential exposure to radiation and moisture. In the case of pigmented compositions, rapid curing is initiated by exposure to moderate radiation and the cure completed by exposure to moisture. The various compositions include radiation reactive groups and moisture reactive oxazolidine and isocyanate groups. The moisture reactive and radiation curable groups preferably are interpolymerized during the curing process.

25 Claims, No Drawings

RADIATION AND MOISTURE CURABLE COMPOSITIONS AND METHOD OF USE

BACKGROUND OF THE INVENTION

This invention relates to radiation curable coating compositions and, more particularly, to the radiation curing of coating compositions which contain filler materials.

Radiation curable coatings, such as inks and films, are of increasing importance because they do not require the use of inert, volatile solvents, which can be objectionable from an environmental protection standpoint. Many radiation curable materials are known, such as liquid monomers and prepolymers or oligomers with ethylenically unsaturated groups which polymerize on exposure to ionizing or actinic radiation. Suitable materials and procedures are described in my prior U.S. Pat. No. 3,989,609.

In the case of compositions which are pigmented or dyed to provide color and opacity, there are often difficulties in radiation curing, especially with actinic radiation of low penetrating power. This is because pigments and additives restrict penetration of the radiation through the base material. The result has been limited use of such materials, the requirement of long exposure times, or the need for using expensive and hazardous ionizing radiation of greater penetrating power.

Accordingly, it is an object of the invention to facilitate the curing of radiation curable coating compositions. A related object is to achieve ready and inexpensive cure even in the presence of filler materials.

Other objects include provision for increased printing and coating speeds with radiation curable materials, and provision of printing plates, indicia, photoresists and the like from partially cured, non-tacky continuous films.

SUMMARY OF THE INVENTION

In accomplishing the foregoing and related objects, the invention provides for the radiation curing of materials in a sequential or concurrent two-step process. In both steps polymerization takes place, with one of the steps involving radiation and the other involving the use of moisture.

As noted above, the exposures to radiation and moisture may be substantially simultaneous or sequential in either order. The radiation reaction, however, is normally faster, particularly in the absence of a moisture reaction catalyst. For inks and coatings the preferred procedure is exposure to radiation to cure the surface to a substantially tack-free solid for handling. Exposure to moisture will then complete the cure to provide the final product.

In the case of substrates that are to be coated in a pattern, for example printing plates, indicia, photoresists, and the like, the steps are usually reversed. The coating is applied and exposed to atmospheric moisture in the absence of polymerizing radiation in order to solidify the surface for handling. Thereafter the moisture-conditioned coating is exposed to radiation in order to fully cure and cross-link the exposed material. Unexposed material can then be washed from the substrate with solvent since the exposed material is substantially insoluble.

Both curing steps can be applied at temperatures ranging from above the gellation temperature of the particular mixture up to about 150° C. with the optimum temperature range being from about ambient temperature to about 100° C., slight variations in these ranges being noted when the conditions of the reaction are carried out at other than ambient i.e. atmospheric moisture. Exposure to atmospheric moisture for a period of time, usually minutes to hours, is sufficient and preferred. If impervious substrates are being coated and either wound or stacked, a liquid spray or steam may be applied to the surface prior to winding or stacking to assure the presence of the desired moisture. For porous or pervious substrates such as paper, the application of moisture is normally unnecessary.

The coating compositions of the invention combine a conventional and preferably commercially available radiation curable material, typically containing ethylenically unsaturated reaction groups, with other reaction groups which are stable in the absence of moisture but react and polymerize when exposed to moisture in greater than trace quantities. Compounds capable of radiation curing or cross-linking can be used. Preferred materials are disclosed in my prior U.S. Pat. No. 3,989,609 herein incorporated by reference. Other illustrative compounds which may be used are styrene, alpha-methylstyrene, chlorostyrene, p-methylstyrene, methyl methacrylate butyl acrylate, n-octyl methacrylate, ethyl acrylate, butyl acrylate, 2-ethylhexyl acrylate, isodecyl acrylate, lauryl acrylate, cyclohexyl acrylate, bicyclo (2.2.1) heptyl methacrylate, tricyclo (5.2.1.0$^{2.6}$) dec-3-(or 4)-en-8 (or 0)-yl acrylate, 2-ethoxyethyl acrylate, 2-butoxyethyl acrylate, 2-cyanoethyl acrylate, 2-(N,N-diethylamino) ethyl acrylate, acrylonitrile, methacrylonitrile, ethylene glycol dimethacrylate, 1,2-propylene glycol diacrylate, 1,4-butanediol diacrylate, neopentyl glycol diacrylate, 1,3-glycerol dimethyacrylate, trimethylolpropane triacrylate, pentaerythritol tetramethacrylate, pentaerythritol triacrylate, and the like.

For curing with ultraviolet radiation, the reaction can be enhanced by including one or more photosensitizers in the compositions in an amount which may be varied from about 0.01 to about 20, preferably about 0.1 to about 10, and most preferably about 0.5 to about 5 percent by weight. Suitable photosensitizers for this purpose are those which will initiate the polymerization of the ethylenic unsaturation. This is accomplished by the photosensitizer either absorbing the U.V. radiation and transferring the energy to an ethylenic unsaturation or by abstracting hydrogen from some other compound to form a radical which will initiate the ethylenic polymerization. Examples of appropriate photosensitizers to be employed throughout this invention include, but are not limited to alkyl ethers of benzoin such as methyl ether of benzoin and isobutylether of benzoin, acetophenone, propiophenone, benzophenone, xanthone, fluorenone, benzaldehyde, fluorene, anthraquinone, triphenylamine, carbazole, 3- or 4-methylacetophenone, 3- or 4-pentylacetophenone, 3- or 4-methoxyacetophenone, 3- or 4-bromoacetophenone, 3- or 4-allylacetophenone, p-diacetylbenzene, 3- or 4-methoxybenzophenone, 3- or 4-methylbenzophenone, 3- or 4-chlorobenzophenone, 4,4'-dimethoxybenzophenone, 4-chloro4'-benzylbenzophenone, 3-chloroxanthone, 3,9-dichloroxanthone, 3-chloro-8-nonylxanthone, 3-methoxyxanthone, 3-iodo-7-methoxyxanthone, and the like. As is readily apparent from the above-identified compounds, most of the ketones named are aromatic. This is due to the fact that aliphatic ketones do not interact with U.V. radiation.

The moisture-initiated polymerization step of the invention is based on the reaction between oxazolidine groups and isocyanate groups in the presence of moisture. Special air drying coatings based on this reaction are commercially available and examples are identified in various examples included below. However, their use and advantage in radiation curing materials has not heretofore been appreciated or suggested.

The oxazolidine compounds have the following structure and are normally attached to the carrier radical "R'" at either the nitrogen or one of the two carbon atoms between the nitrogen and oxygen atoms:

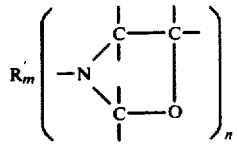

The carrier radical "R'" may be monomeric or polymeric radicals containing ethylenic unsaturation or a bivalent radical such as 2 oxazolidine rings; the remaining oxazolidine ring substituents may be hydrogen, alkyl or aryl radicals, preferably hydrogen or lower alkyl such as methyl, ethyl, propyl, butyl etc. The subscript "m" represents an integer from and including 1 to 4 since a radical "R'" substituent may be placed on the nitrogen atom as well as on the other carbon atom(s). The "n" radical may be an integer from 1 to 10 but is preferably 2 or greater for polymerization. Oxazolidine compounds illustratively may be prepared by reacting polyamines with ethylene oxide and formaldehyde. The conditions of the reaction are well known to one skilled in the art.

The foregoing oxazolidine compounds are mixed with isocyanates, preferably polyisocyanates which are di- or higher functional isocyanates, i.e. having 2 or more isocyanate groups for cross-linking. The combination is stable in the absence of substantial moisture, i.e. a moisture content of greater than about 3 ppm. Suitable isocyanates include one or more of the following: toluene diisocyanate, diphenyl diisocyanate, triphenyl diisocyanate, naphthalene diisocyanate, chlorophenyl-2,4-diisocyanate ethylene diisocyanate, 1,4-tetramethylene diisocyanate, paraphenylene diisocyanate, hexamethylene diisocyanate, 3,3'-dimethyl-4,4'-biphenylene diisocyanate, 3,3'-diisocyanate, polymethylene polyphenyl isocyanates, such as dimethylene triphenyl triisocyanate, and a commercially available polyisocyanate known as PAPI (polymethylene polyphenyl isocyanate which is an aromatic polyisocyanate produced by reacting a phenylisocyanate with formaldehyde) and having an average functionality between two and three.

The moisture-initiated reaction is based on the fact that oxazolidine groups do not react with isocyanate groups until activated with moisture. In the presence of water, the reaction is believed to proceed as follows:

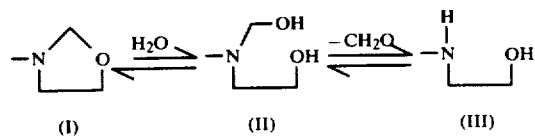

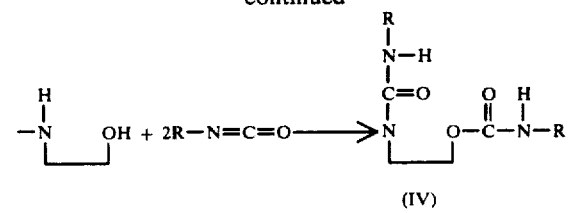

wherein "R" represents a carbon radical having 1 to 36 carbon atoms. The equilibrium of the oxazolidine/water reaction is heavily in favor of the blocked reactive site (oxazolidine), so that trace amounts of moisture will not cause premature reaction. The ratios of the compounds (I), (II), and (III), involved in the above equilibrium are approximately 99/0.5/0.5 at equilibrium. When isocyanate is present in the system, it reacts rapidly and preferentially with the amine-active hydrogen, driving the equilibrium to the right, thus activating more of the oxazolidine functionality. This reaction is faster than a conventional hydroxyl-isocyanate reaction and will proceed without a catalyst.

The compositions afforded by the present invention are thus liquids that are curable by radiation with dispersed oxazolidine and isocyanate groups which react in the presence of moisture. Radiation curing is usually obtained with addition of polymerizable ethylenically unsaturated groups, usually present as end groups. They may be mono-functional, but inclusion of polyfunctional compounds is preferred to promote cross-linking. Compounds containing an oxazolidine or isocyanate group are preferably polyfunctional for polymerization; i.e., also contain at least one additional reactive group which may be any of the three groups previously described. Compounds separately containing each type of reactive groups may be physically mixed. However, it is preferred to include at least one compound having one or more radiation curable groups and at least one or more of the two moisture reactive groups to promote cross-linking of the reaction products of the two curing steps. If desired, all three of the groups may be included in a single compound, prepared for example, by reacting one mole of a triol with three moles of a diisocyanate and coupling two of the free isocyanate groups, respectively, with one mole of hydroxyethyl acrylate and one mole of a hydroxyethyl oxazolidine.

Preferred compounds containing two types of reactive groups include the following: the reaction product of 1 mole 2-hydroxyethyl acrylate and 1 mole aliphatic diisocyanate (e.g. 4,4'-dicyclohexyl methane diisocyanate, 1,6-hexane-diisocyanate, isophorone diisocyanate, etc.); the reaction product of 1 mole 2-hydroxypropyl acrylate and 1 mole 4,4'-bicyclohexyl methane diisocyanate; the reaction product of 1 mole 2-hydroxyethyl acrylate and 1 mole isophorone diisocyanate; the reaction product of 1 mole 2-hydroxyethyl acrylate and 1 mole 1.6-hexyl diisocyanate; the reaction product of 1 mole poly(propylene oxide) triol and 3 moles 4,4'-dicyclohexyl methane diisocyanate and 1 mole 2-hydroxyethyl acrylate; the reaction product of 1 mole poly(propylene oxide) triol and 3 moles 4,4'-dicyclohexyl methane diisocyanate and 2 moles 2-hydroxyethyl acrylate; the reaction product of 1 mole N(2-hydroxyethyl) oxazolidine and 1 mole 1.6-hexane diisocyanate; the reaction product of 1 mole poly (propylene oxide) triol and 3 moles hexamethylene diisocyanate and 1 mole 2-hydroxyethyl acrylate; the reaction product of 1 mole poly(propylene oxide) triol and 3 moles hexamethylene diisocyanate and 2 moles 2-hydroxyethyl acrylate; the reaction product of 1 mole bisglycidyl ether of bisphenol A, 2 moles acrylic acid and 2 moles 4,4'-dicyclohexyl methane diisocyanate; the reaction product of 1 mole poly(propylene oxide) triol, 3 moles dicyclohexyl methane 4,4'-diisocyanate, 2 moles 2-hydroxyethyl acrylate and 1 mole N(2-hydroxyethyl) oxazolidine; and the reaction product of 1 mole 2-norbornene5-methanol and 1 mole hexamethylene diisocyanate. Although it is noted that equimolar amounts of the diisocyanate and the hydroxy compound were described in the above reaction product, it will be appreciated that when the reaction is conducted, you do not want to have more hydroxyl groups than you have isocyanates; that is, you want to have 1 isocyanate to react with each hydroxyl group. Thus, the amount of isocyanate and hydroxy compound to be employed initially will be adjustable from case to case depending upon the specific reactants and catalyst employed.

The coating compositions may also contain known ethylenically unsaturated monomers of relatively low molecular weight (i.e., from about 50 to 1,000) to control viscosity, coating and other properties. Preferably, such monomers do not constitute more than about thirty (30) percent of the weight of the polymerizable materials. Suitable monomers include the following: olefinic hydrocarbons containing up to about 18 carbon atoms such as ethylene, propylene, butylenes, pentenes, hexenes, dodecene, heptenes, octenes, styrene, 4-methylstyrene, alpha methylstyrene, cyclopentadiene, dicyclopentadiene, butadiene, bicyclo (2.2.1) hept-2-ene, bicyclo (2.2.1) hept-2,5-diene, methylbicyclo (2.2.1) hept-2-ene, cyclohexene, 4-methyl-1-pentene, 5-methyl-1-hexene and the like; the vinyl halides such as vinyl chloride, vinylidene chloride, and the like; the vinyl esters such as vinyl acetate, vinyl butyrate, vinyl benzoate, and the like; the vinyl ketones such as isopropenyl methyl ketone, vinyl phenyl ketone, vinyl methyl ketone, alpha chlorovinyl methyl ketone, and the like; the vinyl thioethers such as vinyl ethyl sulfide, vinyl p-tolyl sulfide, divinyl sulfide, and the like. Other monomers that can be used are divinyl sulfone, vinyl ethyl sulfone, vinyl ethyl sulfoxide, vinyl sulfonic acid, sodium vinyl sulfonate, vinyl sulfonamide, vinyl pyridine, N-vinyl pyrrolidone, N-vinyl carbazole, and the like. The preferred monomers include styrene and its derivative and the acrylyl and methacrylyl compounds and the derivatives thereof.

Suitable amounts of other ingredients such as pigments, fillers, wetting agents, flattening agents, leveling agents, and the like employed in coating compositions may also be included. Also, amounts up to about 40% by weight of prepolymerized polymers, preferably substantially linear polymers, soluble in the coating composition may be included to control shrinkage and to improve strength and other properties. Many such polymers are suitable, including polyolefins, poly vinyls, polyacrylates, polyethers, polyamides, polyurethanes, and the like, and copolymers thereof.

The compositions of the present invention, with or without pigments or other coloring materials, may be applied to any desired substrate by any suitable coating or printing technique. The substrate may be paper, wood, metal, plastic or the like which may be pretreated as desired, for example by filling and/or priming wood substrates prior to application of the coatings or inks. They may also be subsequently treated, as desired, for example, by overprinting.

DETAILED DESCRIPTION

The invention is illustrated by the following non-limiting Examples, of which Examples 1-25 illustrate preparation of prepolymers of oligomers containing radiation-curable ethylenically unsaturated groups together with reactive isocyanate groups, and Examples 26-50 illustrate complete coating compositions and procedures. Where applicable, the concentration of reactants is expressed in parts by weight.

EXAMPLE 1

522 parts 2,4-toluene diisocyanate, 888 parts trimethylolpropane triacrylate, and 0.03 parts stannous octoate are placed in a vessel equipped with a thermometer and an agitator. The mixture is blanketed with nitrogen and heated to about 50° C. Then with stirring 710 parts of poly (propylene oxide) triol (Dow Voranol 2070, hydroxyl No. 229) are added at such a rate that the temperature of the reaction mixture does not rise above about 65° C. Then the reaction mixture is kept stirring at 50° C. until the isocyanate content has dropped to 5.9%. At this time, the nitrogen blanket is replaced by a dry air blanket and 116 parts of 2-hydroxyethyl acrylate are added at such a rate that the temperature of the reaction mixture does not exceed about 65° C. The reaction mixture is kept stirring at 65° C. until the isocyanate content has dropped to 3.8%. Then 1 part p-methoxyphenol (polymerization inhibitor) is added. The product consists of 1348 parts prepolymer in 888 parts trimethylolpropane triacrylate. The product is a clear, colorless, viscous oil. It is calculated that the prepolymer contains 1 equivalent unsaturation and 2 equivalents of isocyanate per mole.

EXAMPLE 2

522 parts 2,4-toluene diisocyanate, 888 parts 1.6 hexanediol diacrylate, and 0.03 parts stannous octoate are placed in a vessel equipped with a thermometer and an agitator. The mixture is blanketed with nitrogen and heated to about 50° C. Then with stirring 710 parts of poly (propylene oxide) triol (Dow Voranol 2070, hydroxyl No. 229) are added at such a rate that the temperature of the reaction mixture does not rise above about 65° C. Then the reaction mixture is kept stirring at 50° C. until the isocyanate content has dropped to 5.9%. At this time, the nitrogen blanket is replaced by a dry air blanket and 232 parts of 2-hydroxyethyl acrylate are added at such a rate that the temperature of the reaction mixture does not exceed about 65° C. The reaction mixture is kept stirring at 65° C. until the isocyanate content has dropped to 1.8%. Then 1.5 parts p-methoxyphenol (polymerization inhibitor) is added. The product consists of 1464 parts prepolymer in 888 parts 1.6 hexanediol diacrylate. The product is a clear, colorless, viscous oil. It is calculated that the prepolymer contains 2 equivalents unsaturation and 1 equivalent of isocyanate per mole.

EXAMPLE 3

786 parts 4.4'-dicyclohexyl methane diisocyanate, 888 parts trimethylolpropane triacrylate, and 0.03 parts stannous octoate are placed in a vessel equipped with a thermometer and an agitator. The mixture is blanketed with nitrogen and heated to about 50° C. Then with stirring 710 parts of poly (propylene oxide) triol (Dow Voranol 2070, hydroxyl No. 229) are added at such a rate that the temperature of the reaction mixture does not rise above 50° C. Then the reaction mixture is kept stirring at 50° C. until the isocyanate content has dropped to 5.3%. At this time, the nitrogen blanket is replaced by a dry air blanket and 116 parts of 2-hydroxyethyl acrylate are added at such a rate that the temperature of the reaction mixture does not exceed about 65° C. The reaction mixture is kept stirring at 65° C. until the isocyanate content has dropped to 3.3%. Then 1 part p-methoxyphenol (polymerization inhibitor) is added to the reaction mixture. The product consists of 1612 parts prepolymer in 888 parts trimethylolpropane triacrylate. The product is a clear, colorless, viscous oil. It is calculated that the prepolymer contains 1 equivalent unsaturation and 2 equivalents of isocyanate per mole.

EXAMPLE 4

786 parts 4.4'-dicyclohexyl methane diisocyanate, 888 parts 1,6-hexanediol diacrylate, and 0.03 parts stannous octoate are placed in a vessel equipped with a thermometer and an agitator. The mixture is blanketed with nitrogen and heated to about 50° C. Then with stirring 710 parts of poly (propylene oxide) triol (Dow Voranol 2070, hydroxyl No. 229) are added at such a rate that the temperature of the reaction mixture does not rise above 50° C. Then the reaction mixture is kept stirring at 50° C. until the isocyanate content has dropped to 5.3%. At this time, the nitrogen blanket is replaced by a dry air blanket and 232 parts of 2-hydroxyethyl acrylate are added at such a rate that the temperature of the reaction mixture does not exceed about 65° C. The reaction mixture is kept stirring at 65° C. until the isocyanate content has dropped to 1.6%. Then 1 part p-methoxyphenol (polymerization) inhibitor) is added to the reaction mixture. The product consists of 1728 parts prepolymer in 888 parts 1,6-hexanediol diacrylate. The product is a clear, colorless, viscous oil. It is calculated that the prepolymer contains 2 equivalents unsaturation and 1 equivalent of isocyanate per mole.

EXAMPLE 5

666 parts isophorone diisocyanate, 888 parts trimethylolpropane triacrylate, and 0.03 parts stannous octoate are placed in a vessel equipped with a thermometer and an agitator. The mixture is blanketed with nitrogen and heated to 50° C. Then with stirring 258 parts of poly (propylene oxide) triol (Dow Voranol CP260, hydroxyl No. 653) are added at such a rate that the temperature of the reaction mixture does not rise above about 65° C. Then the reaction mixture is kept stirring at about 50° C. until the isocyanate content has dropped to 7.0%. At this time, the nitrogen blanket is replaced by a dry air blanket and 116 parts of 2-hydroxyethyl acrylate are added at such a rate that the temperature of the reaction mixture does not exceed 65° C. The reaction mixture is kept stirring at 65° C. until the isocyanate content has dropped to 4.35%. Then 1 part p-methoxyphenol (polymerization inhibitor) is added to the reaction mixture. The product consists of 1040 parts prepolymer in 888 parts trimethylolpropane triacrylate. The product is a clear, colorless viscous oil. It is calculated that the prepolymer contains 1 equivalent unsaturation and 2 equivalents of isocyanate per mole.

EXAMPLE 6

786 parts 4.4'-dicyclohexyl methane diisocyanate, 888 parts 1,6-hexanediol diacrylate, and 0.03 parts stannous octoate are placed in a vessel equipped with a thermometer and an agitator. The mixture is blanketed with nitrogen and heated to about 50° C. Then with stirring 258 parts of poly (propylene oxide) triol (Dow Voranol CP260, hydroxyl No. 653) are added at such a rate that the temperature of the reaction mixture does not rise above about 65° C. Then the reaction mixture is kept stirring at 50° C. until the isocyanate content has dropped to 6.5%. At this time, the nitrogen blanket is replaced by a dry air blanket and 232 parts of 2-hydroxyethyl acrylate are added at such a rate that the temperature of the reaction mixture does not exceed about 65° C. The reaction mixture is kept stirring at 65° C. until the isocyanate content has dropped to 2.0%. Then 1 part p-methoxyphenol (polymerization inhibitor) is added. The product consists of 1276 parts prepolymer in 888 parts 1,6 -hexanediol diacrylate. The product is a clear, colorless, viscous oil. It is calculated that the prepolymer contains 2 equivalents unsaturation and 1 equivalent of isocyanate per mole.

EXAMPLE 7

524 parts 4.4'-dicyclohexyl methane diisocyanate, 888 parts 1,6-hexanediol diacrylate, and 0.03 parts stannous octoate are placed in a vessel equipped with a thermometer and an agitator. The mixture is blanketed with nitrogen and heated to about 50° C. Then with stirring 408 parts of poly (propylene oxide) diol (Dow Voranol P400; hydroxyl No. 275) are added at such a rate that the temperature of the reaction mixture does not rise above about 65° C. Then the reaction mixture is kept stirring at 50° C. until the isocyanate content has dropped to 4.6%. At this time, the nitrogen blanket is replaced by a dry air blanket and 116 parts of 2-hydroxyethyl acrylate are added at such a rate that the temperature of the reaction mixture does not exceed about 65° C. The reaction mixture is kept stirring at 65° C. until the isocyanate content has dropped to 2.2%. Then 1 part p-methoxyphenol (polymerization inhibitor) is added. The product consists of 1048 parts prepolymer in 888 parts 1,6-hexanediol diacrylate. The product is a clear, colorless viscous oil. It is calculated that the prepolymer contains 1 equivalent unsaturation and 1 equivalent of isocyanate per mole.

EXAMPLE 8

348 parts 2,4-toluene diisocyanate, 888 parts trimethylolpropane triacrylate, and 0.03 parts stannous octoate are placed in a vessel equipped with a thermometer and an agitator. The mixture is blanketed with nitrogen and heated to about 50° C. Then with stirring 408 parts of poly (propylene oxide) diol (Dow Voranol P400; hydroxyl No. 275) are added at such a rate that the temperature of the reaction mixture does not rise above about 65° C. Then the reaction mixture is kept stirring at 50° C. until the isocyanate content has dropped to 5.1%. At this time, the nitrogen blanket is replaced by a dry air blanket and 116 parts of 2-hydroxyethyl acrylate are added at such a rate that the temperature of the reaction mixture does not exceed 65° C. The reaction mixture is kept stirring at 65° C. until the isocyanate content has dropped to 2.3%. Then 1 part p-methoxyphenol (polymerization inhibitor is added. The product consists of 872 parts prepolymer in 888 parts trimethylolpropane triacrylate. The product is a clear, colorless, viscous oil. It is calculated that the prepolymer contains 1 equivalent unsaturation and 1 equivalent of isocyanate per mole.

EXAMPLE 9

666 parts isophorone diisocyanate, 888 parts trimethylolpropane triacrylate, and 0.03 parts stannous octoate are placed in a vessel equipped with a thermometer and an agitator. The mixture is blanketed with nitrogen and heated to about 50° C. Then with stirring 710 parts of poly (propylene oxide) triol (Dow Voranol 2070, hydroxy No. 229) are added at such a rate that the temperature of the reaction mixture does not rise above about 65° C. Then the reaction mixture is kept stirring at 50° C. until the isocyanate content has dropped to 5.5%. At this time, the nitrogen blanket is replaced by a dry air blanket and 116 parts of 2-hydroxyethyl acrylate are added at such a rate that the temperature of the reaction mixture does not exceed about 65° C. The reaction mixture is kept stirring at 65° C. until the isocyanate content has dropped to 3.5%. Then 1 part p-methoxyphenol (polymerization inhibitor) is added. The product consists of 1492 parts prepolymer in 888 parts trimethylolpropane triacrylate. The product is a clear, colorless, viscous oil. It is calculated that the prepolymer contains 1 equivalent unsaturation and 2 equivalents of isocyanate per mole.

EXAMPLE 10

504 parts 1,6-hexamethylene diisocyanate, 888 parts trimethylolpropane triacrylate and 0.03 parts stannous octoate are placed in a vessel equipped with a thermometer and an agitator. The mixture is blanketed with nitrogen and heated to about 50° C. Then with stirring 710 parts of poly (propylene oxide) triol (Dow Voranol CP260; hydroxyl No. 653) are added at such a rate that the temperature of the reaction mixture does not rise above about 65° C. Then the reaction mixture is kept stirring at 50° C. until the isocyanate content has dropped to 7.6%. At this time, the nitrogen blanket is replaced by a dry air blanket and 116 parts of 2-hydroxyethyl acrylate are added at such a rate that the temperature of the reaction mixture does not exceed about 65° C. The reaction mixture is kept stirring at 65° C. until the isocyanate content has dropped to 4.7%. Then 1 part p-methoxyphenol (polymerization inhibitor) is added. The product consists of 1320 parts prepolymer in 888 parts trimethylolpropane triacrylate. The product is a clear, colorless, viscous oil. It is calculated that the prepolymer contains 1 equivalent unsaturation and 2 equivalents of isocyanate per mole.

EXAMPLE 11

484 parts acrylated bisglycidyl ether of bisphenol A (Shell Epocryl DRH303), 832 parts dry toluene, 0.2 parts cuprous oxide, and 0.25 parts stannous octoate are placed in a vessel equipped with an agitator. The mixture is blanketed with dry air and kept at room temperature. With stirring, 348 parts 2,4-toluene diisocyanate are added at such a rate that the temperature of the reaction mixture remains around 25° C. After the addition is completed, the reaction mixture is kept stirring until the isocyanate content has dropped to 5.0%. The solvent is then removed under reduced pressure (i.e., less than atmospheric pressure) at room temperature (as fast as possible to avoid polymerization). A heavy resinous oil is obtained as the product, containing 9.6% isocyanate.

EXAMPLE 12

484 parts acrylated bisglycidyl ether of bisphenol A, (Shell Epocryl DRH303), 1008 parts dry toluene, 0.2 parts cuprous oxide, and 0.25 parts stannous octoate are placed in a vessel equipped with an agitator. The mixture is blanketed with dry air and kept at room temperature. With stirring, 524 parts 4,4-dicyclohexylmethane diisocyanate are added at such a rate that the temperature of the reaction mixture remains around 25° C. After addition is completed, the reaction mixture is kept stirring until the isocyanate content has dropped to 4.2%. The solvent is then removed under reduced pressure (i.e., less than atmospheric pressure) at room temperature (as fast as possible to avoid polymerization). A heavy resinous oil is obtained as the product, containing 8.0% isocyanate.

EXAMPLE 13

484 parts acrylated bisglycidyl ether of bisphenol A (Shell Epocryl DRH303), 820 parts dry toluene, 0.2 parts cuprous oxide, and 0.25 parts stannous octoate are placed in a vessel equipped with an agitator. The mixture is blanketed with dry air and kept at room temperature. With stirring, 336 parts 1,6-hexanediol diisocyanate are added at such a rate that the temperature of the reaction mixture remains around 25° C. After the addition is completed, the reaction mixture is kept stirring until the isocyanate content has dropped to 5.1%. The solvent is then removed under reduced pressure (i.e., less than atmospheric pressure) at room temperature (as fast as possible to avoid polymerization). A heavy resinous oil is obtained as the product, containing 9.8% isocyanate.

EXAMPLE 14

484 parts acrylated bisglycidyl ether of bisphenol A (Shell Epocryl DRH303), 928 parts dry toluene, 0.2 parts cuprous oxide, and 0.25 parts stannous octoate are placed in a vessel equipped with an agitator. The mixture is blanketed with dry air and kept at room temperature. With stirring, 444 parts isophorone diisocyanate are added to the mixture at such a rate that the temperature of the reaction mixture remains around 25° C. After addition is completed, the reaction mixture is kept stirring until the isocyanate content has dropped to 4.5%. The solvent is then removed under reduced pressure (i.e., less than atmospheric pressure) at room temperature (as fast as possible to avoid polymerization). A heavy resinous oil is obtained as the product, containing 8.6% isocyanate.

EXAMPLE 15

174 parts 2,4-toluene diisocyanate, 58 parts dry toluene, and 0.01 part stannous octoate are placed in a vessel equipped with an agitator and a thermometer. The mixture is blanketed with dry air and heated to about 50° C. While stirring, 116 parts 2-hydroxyethyl acrylate are added at a rate such that the temperature of the reaction mixture does not exceed about 60° C. After the addition is completed, the reaction mixture is kept stirring at 60° C. until the isocyanate content has dropped to 12.0%. Then 1 part p-methoxyphenol is added to the reaction mixture. The mixture is then sparged at room temperature with dry air to remove residual solvent. The product contains 14.1% isocyanate.

EXAMPLE 16

262 parts 4,4'-dicyclohexylmethane diisocyanate, 76 parts dry toluene, and 0.01 part stannous octoate are placed in a vessel equipped with an agitator and a thermometer. The mixture is blanketed with dry air and heated to about 50° C. While stirring, 116 parts 2-hydroxyethyl acrylate are added to the mixture at a rate such that the temperature of the reaction mixture does not exceed about 60° C. After the addition is completed, the reaction mixture is kept stirring at 60° C. until the isocyanate content had dropped to 9.3%. Then 1 part p-methoxyphenol is added to the reaction mixture. The solvent is then removed under reduced pressure at room temperature (as fast as possible to avoid polymerization). A heavy resinous oil is obtained as the product containing 11.6% isocyanate.

EXAMPLE 17

168 parts 1,6-hexanediol diisocyanate, 57 parts trimethylolpropane triacrylate, and 0.01 part stannous octoate are placed in a vessel equipped with an agitator and a thermometer. The mixture is blanketed with dry air and heated to about 50° C. With stirring, 116 parts 2-hydroxyethyl acrylate are added at a rate such that the temperature does not exceed about 60° C. After the addition is completed the reaction mixture is kept stirring at 60° C. until the isocyanate content has dropped to 12.3%. At this time, 1 part p-methoxyphenol is added to the reaction mixture. The product is a viscous oil consisting of 284 parts 6-isocyanatohexoxyethyl acrylate in 57 parts trimethylolpropane triacrylate.

EXAMPLE 18

222 parts isophorone diisocyanate, 67 parts trimethylolpropane triacrylate, and 0.01 part stannous octoate are placed in a vessel equipped with an agitator and a thermometer. The mixture is blanketed with dry air and heated to about 50° C. With stirring, 116 parts 2-hydroxyethyl acrylate are added at a rate such that the temperature of the reaction mixture does not exceed about 60° C. After addition is completed, the reaction mixture is kept stirring at 60° C. until the isocyanate content has dropped to 10.4%. At this time, 1 part p-methoxyphenol is added. A highly viscous oil is obtained as the product.

EXAMPLE 19

174 parts 2,4-toluene diisocyanate, 58 parts 1,6-hexanediol diacrylate, and 0.01 part stannous octoate are placed in a vessel equipped with an agitator and a thermometer. The mixture is blanketed with dry air and heated to about 50° C. With stirring, 116 parts 2-hydroxyethyl acrylate are added at a rate such that the temperature of the reaction mixture does not exceed 60° C. After the addition is completed, the reaction mixture is kept stirring at 60° C. until the isocyanate content has dropped to 12.0%. At this time, 1 part p-methoxyphenol (polymerization inhibitor) is added. A heavy resinous oil is obtained as the product.

EXAMPLE 20

168 parts 1,6-hexane diisocyanate, 57 parts 1,6-hexane diol diacrylate and 0.01 parts stannous octoate are placed in a vessel equipped with an agitator and a thermometer. The mixture is blanketed with dry air and heated to about 50° C. With stirring, 116 parts 2-hydroxyethyl acrylate are added to the mixture at a rate such that the temperature does not exceed about 60° C. After the addition is completed the reaction mixture is kept stirring at 60° C. until the isocyanate content has dropped to 12.3%. At this time, 1 part p-methoxyphenol is added. A heavy resinous oil is obtained as the product.

EXAMPLE 21

525 parts polyisocyanate of toluene diisocyanate in butyl acetate (1:1) (Desmodur IL, Mobay Chemical), and 0.03 parts stannous octoate are placed in a vessel equipped with an agitator and a thermometer. The mixture is blanketed with dry air and heated to about 50° C. With stirring, 39 parts 2-hydroxyethyl acrylate are added at a rate such that the reaction mixture temperature does not exceed about 60° C. The reaction mixture is kept stirring until the isocyanate content has dropped to 4.9%. At this time, 1 part p-methoxyphenol is added (as a polymerization inhibitor). The product is a medium weight oil consisting of 301 parts prepolymer and 262.5 parts solvent (butyl acetate). It is calculated that the prepolymer contains 2 isocyanate groups for every acrylate group.

EXAMPLE 22

404 parts toluene diisocyanate-based adduct in 25/15 ethyleneglycolacetate/xylol blend (60% solids) (Mondur CB-60, Mobay Chemical), and 0.03 parts stannous octoate are placed in a vessel equipped with an agitator and a thermometer. The mixture is blanketed with dry air and heated to about 50° C. With stirring, 39 parts 2-hydroxyethyl acrylate are added at a rate such that the reaction mixture temperature does not exceed about 60° C. The reaction mixture is kept stirring until the isocyanate content has dropped to 6.3%. At this time, 1 part p-methoxyphenol is added (as a polymerization inhibitor). The product is a medium weight oil consisting of 281 parts prepolymer and 162 parts solvent (25/15 ethyleneglycolacetate/xylol blend). It is calculated that the prepolymer contains 2 isocyanate groups for every acrylate group.

EXAMPLE 23

365 parts aromatic/aliphatic polyisocyanate in 25/15 athyleneglycol acetate/xylol blend (60% solids) (Mondour HC, Mobay Chemical), and 0.03 parts stannous octoate are placed in a vessel equipped with an agitator and a thermometer. The mixture is blanketed with dry air and heated to about 50° C. With stirring, 39 parts 2-hydroxyethyl acrylate are added at a rate such that the reaction mixture temperature does not exceed about 60° C. The reaction mixture is kept stirring until the isocyanate content has dropped to 6.9%. At this time, 1 part p-methoxyphenol is added (as a polymerization inhibitor). The product is a medium viscosity oil (approximately 1,000 cp) consisting of 258 parts prepolymer and 146 parts solvent (25/15 ethyleneglycol acetate/xylol bland). It is calculated that the prepolymer contains 2 isocyanate groups for every acrylate group.

EXAMPLE 24

195 parts polyfunctional aliphatic isocyanate (Desmodur N-100, Mobay Chemical), and 0.03 parts stannous octoate are placed in a vessel equipped with an agitator and a thermometer. The mixture is blanketed with dry air and heated to about 50° C. With stirring, 39 parts 2-hydroxyethyl acrylate are added at a rate such that the reaction mixture temperature does not exceed about 60° C. The reaction mixture is kept stirring until the isocyanate content has dropped to 11.9%. At this time, 1 part p-methoxyphenol is added (as a polymerization inhibitor). The product is a medium viscosity oil (approximately 1,000 cp), consisting of 234 parts prepolymer. It is calculated that the prepolymer contains 2 isocyanate groups for every acrylate group.

EXAMPLE 25

132 parts polymethylene polyphenol isocyanate (Mondur MRS, Mobay Chemical), and 0.03 parts stannous octoate are placed in a vessel equipped with an agitator and a thermometer. The mixture is blanketed with dry air and heated to about 50° C. With stirring, 78 parts 2-hydroxyethyl acrylate are added at a rate such that the reaction mixture temperature does not exceed about 60° C. The reaction mixture is kept stirring until the isocyanate content has dropped to 6.6%. At this time, 1 part p-methoxyphenol is added (as a polymerization inhibitor). The product is a medium viscosity oil (approximately 1,000 cp), consisting of 210 parts prepolymer. It is calculated that the prepolymer contains 1 isocyanate group for every 2 acrylate groups.

Examples 26 to 48 refer to the specific coatings having a "pencil hardness" of, for example, HB, 3H etc. This code was adopted by a pencil manufacturers to define the relative hardness or softness of their pencils. This same code has been adopted by coating manufacturers and has been employed herein to define the hardness of the inventive coatings. The scale is as follows: 6B (softest) 5H, 4B, 3B, 2B, B, HB, F, H, 2H, 3l H, 4H, 5H, 6H, 7H, 8H, and 9H (hardest). Therefore, when a given coating is designated as having a given hardness, e.g. of 3H, it means that it was able to resist scratching up to that value but was susceptible to scratching when subjected to the more severe conditions associated with a higher H designation.

EXAMPLE 26

312 parts acrylic polymer with oxazolidine side chains (Rohm & Haas QR-568; 1.0 equivalent active hydrogen), 334 parts product of Example 12 (acrylated bisglycidyl ether of bisphenol A, reacted with 2 moles 4,4'-dicyclohexylmethane diisocyanate, 0.63 equivalent isocyanate), 143 parts product of Example 16 (2-hydroxyethyl acrylate reacted with 4,4'-dicyclohexyl methane diisocyanate, 0.37 equivalent isocyanate), 300 parts 1,6-hexanediol diacrylate, and 10.0 parts stearyl acrylate are mixed thoroughly and stripped with an oil pump at room temperature. Then 25.0 parts L-45 silicone fluid (Union Carbide) and 30.0 parts Benzoin isobutyl ether are added and mixed thoroughly. Films of 0.4 mil thickness are applied with a wire wound coating rod onto paper, aluminum foil, vinyl-coated aluminum foil, mylar, glass, and steel. The coated substrates are exposed for 1/10 second to the U.V. radiation given off by a medium pressure mercury vapor lamp (Hanovia 200 w/inch) at a distance of 5 inches from the lamp. This distance coincides with the second focal point created by the elliptical reflector.

After this exposure, all samples are dry to the touch. The coatings on glass have a pencil hardness of HB, and, using methyl ethyl ketone as the solvent, the coating is not resistant to hand rubbing.

The samples are kept at room temperature. After 24 hours, the pencil hardness has increased to 3H, and the coatings have a rub resistance of more than 40 hand rubs, using methyl ethyl ketone as the solvent.

EXAMPLE 27

312 parts acrylic polymer with oxazolidine side chains (Rohm & Haas QR-568; 1.0 equivalent active hydrogen), 334 parts product of Example 12 (acrylated bisglycidyl ether of bisphenol A reacted with 2 moles 4,4'-dicyclohexylmethane diisocyanate; 0.63 equivalent isocyanate), 143 parts product of Example 16 (2-hydroxyethyl acrylate reacted with 4,4'-dicyclohexylmethane diisocyanate; 0.37 equivalent isocyanate), 300 parts 1,6-hexanediol diacrylate, and 10.0 parts stearyl acrylate are mixed thoroughly and stripped with an oil pump at room temperature. Then 25.0 parts L-45 silicone fluid (Union Carbide) and 297 parts primrose yellow (Hercules) are added. The mixture is ball milled until homogenous. Then 30.0 parts Benzoin isobutyl ether is added. Films of 0.4 mil thickness are applied with a wire wound coating rod onto paper, aluminum foil, vinyl-coated aluminum foil, mylar, glass, and steel. The coated substrates are exposed for 1/10 second to the U.V. radiation given off by a medium pressure mercury vapor lamp (Hanovia 200 w/inch) at a distance of 5 inches from the lamp. This distance coincides with the second focal point created by the elliptical reflector.

After this exposure, all samples are dry to the touch, but are scratched readily by one's fingernail.

The samples are kept at room temperature. After 24 hours, the pencil hardness has increased to 3H, the films are abrasion resistant, and resist more than 40 hand rubs using methyl ethyl ketone as the solvent.

EXAMPLE 28

312 parts acrylic polymer with oxazolidine side chains (Rohm & Haas QR-568; 1.0 equivalent active hydrogen), 308 parts product of Example 14 (acrylated bisglycidyl ether of bisphenol A reacted with 2 moles isophorone diisocyanate; 0.63 equivalent isocyanate), 128 parts product of Example 18 (2-hydroxyethyl acrylate reacted with isophorone diisocyanate; 0.37 equivalent isocyanate), 300 parts 1,6-hexanediol diacrylate, and 10.0 parts stearyl acrylate are mixed well and stripped with an oil pump at room temperature. Then 25.0 parts L-45 silicone fluid (Union Carbide) and 510 parts Wayne Red Toner (Hercules) are added. The mixture is ball milled until homogenous. Then 30.0 parts Benzoin isobutyl ether is added to the mixture. Films of 0.4 mil thickness are applied to the resultant substrates with a wire wound coating rod onto paper, aluminum foil, vinyl-coated aluminum foil, mylar, glass, and steel. The coated substrates are exposed for 1/10 second to the U.V. radiation given off by a medium pressure mercury vapor lamp (Hanovia 200 w/inch) at a distance of 5 inches from the lamp. This distance coincides with the second focal point created by the elliptical reflector.

After this exposure, all samples are dry to the touch but are scratched readily by one's fingernail.

The samples are kept at room temperature. After 24 hours, the pencil hardness has increased to 3H, the films are abrasion resistant, and resist more than 40 hand rubs, using methyl ethyl ketone as the solvent.

EXAMPLE 29

312 parts acrylic polymer with oxazolidine side chains (Rohm & Haas QR-568; 1.0 equivalent active hydrogen), 272 parts product of Example 13 L (acrylated bisglycidyl ether of bisphenol A reacted with 2 moles 1,6-hexane diisocyanate; 0.63 equivalent isocyanate), 108 parts product of Example 17 (2-hydroxyethyl acrylate reacted with 1,6-hexane diisocyanate; 0.37 equivalent isocyanate), 300 parts 1,6-hexanediol diacrylate, and 10.0 parts stearyl acrylate are mixed well and stripped with an oil pump at room temperature. Then 25.0 parts L-45 silicone fluid (Union Carbide) and 372 parts magnox black 3525 (Hercules) is added. The mixture is ball milled until homogenous. Then 30.0 parts Benzoin isobutyl ether is added. Films of 0.4 mil thickness are applied to the resultant substrates with a wire wound coating rod onto paper, aluminum foil, vinyl-coated aluminum foil, mylar, glass, and steel. The coated substrates are exposed for 1/10 second to the U.V. radiation given off by a medium pressure mercury vapor lamp (Hanovia 200 w/inch) at a distance of 5 inches from the lamp. This distance coincides with the second focal point created by the elliptical reflector.

After this exposure, all samples are dry to the touch, but are scratched readily by one's fingernail.

The samples are kept at room temperature. After 24 hours, the pencil hardness has increased to 3H, the films are abrasion resistant, and resist more than 40 hand rubs, using methyl ethyl ketone as the solvent.

EXAMPLE 30

312 parts acrylic polymer with oxazolidine side chains (Rohm & Haas QR-568; 1.0 equivalent active hydrogen), 308 parts product of Example 14 (acrylated bisglycidyl ether of bisphenol A reacted with 2 moles isophorone diisocyanate; 0.63 equivalent isocyanate), 128 parts product of Example 18 (2-hydroxyethyl acrylate reacted with isophorone diisocyanate; 0.37 equivalent isocyanate), 300 parts 1,6-hexanediol diacrylate, and 10.0 parts cyclododecane are mixed thoroughly and stripped with an oil pump at room temperature. Then 25.0 parts L-45 silicone fluid (Union Carbide) and 478 parts magnox black 3525 (Hercules) are added to the mixture. The mixture is ball milled until homogenous. Then 30.0 parts Benzoin isobutyl ether is added. Films of 0.4 mil thickness are applied to the resultant substrates with a wire wound coating rod onto paper, aluminum foil, vinyl-coated aluminum foil, mylar, glass, and steel. The coated substrates are exposed for 1/5 second to the U.V. radiation given off by a medium pressure mercury vapor lamp (Hanovia 200 w/inch) at a distance of 5 inches from the lamp. This distance coincides with the second focal point created by the elliptical reflector.

After this exposure, all samples are dry to the touch, but are scratched readily by one's fingernail.

The samples are kept at room temperature. After 24 hours, the pencil hardness has increased to 3H, the films are abrasion resistant, and resist more than 40 hand rubs, using methyl ethyl ketone as the solvent.

EXAMPLE 31

312 parts acrylic polymer with oxazolidine side chains (Rohm & Haas QR-568; 1.0 equivalent active hydrogen), 144 parts product of Example 13 (acrylated bisglycidyl ether of bisphenol A reacted with 2 moles 1,6-hexane diisocyanate; 0.33 equivalent isocyanate), 97.2 parts product of Example 17 (2-hydroxyethyl acrylate reacted with 1,6-hexane diisocyanate; 0.33 equivalent isocyanate), 412 parts product of Example 3 [4,4'-dicyclohexylmethane diisocyanate reacted with poly (propylene oxide) triol (Dow Voranol 2070; hydroxyl No. 229) and then with 2-hydroxy ethyl acrylate; 0.33 equivalent isocyanate]8 parts stearyl acrylate, and 100 parts 1,6-hexanediol diacrylate are mixed thoroughly and stripped with an oil pump at room temperature. Then 20 parts L-45 silicone fluid (Union Carbide) and 80 parts of Benzoin isobutyl ether are added and mixed thoroughly.

Films of 0.4 mil thickness are applied to the resultant substrates with a wire wound coating rod onto paper, aluminum foil, vinyl-coated aluminum foil, mylar, glass, and steel. The coated substrates are exposed for 1/10 second to the U.V. radiation given off by a medium pressure mercury vapor lamp (Hanovia 200 w/inch) at the distance of 5 inches from the lamp. This distance coincides with the second focal point created by the elliptical reflector.

After this exposure all samples are dry to the touch. On glass, the coating has a pencil hardness of at least HB. Using methyl ethyl ketone as a solvent, the coating does not hold up to rubbing.

Left to stand at room temperature, after 24 hours the coatings are tested again. Pencil hardness has increased to 3H, and the coating has a hand rub resistance of at least 40 hand rubs, using methyl ethyl ketone as the solvent.

EXAMPLE 32

312 parts acrylic polymer with oxazolidine side chains (Rohm & Haas QR-568; 1.0 equivalent active hydrogen), 177 parts product of Example 12 (acrylated bisglycidyl ether of bisphenol A reacted with 2 moles 4,4'-dicyclohexyl methane diisocyanate; 0.33 equivalent isocyanate), 129.4 parts product of Example 16 (2-hydroxyethyl acrylate reacted with 4,4'-dicyclohexyl methane diisocyanate, 0.33 equivalant isocyanate), 412 parts product of Example 3 [4,4'-dicyclohexyl methane diisocyanate reacted with poly (propylene oxide) triol (Dow Voranol 2070, hydroxyl No. 229) and then with 2-hydroxy ethyl acrylate; 0.33 equivalent isocyanate], 8 parts cyclododecane, 100 parts 1,6-hexanediol diacrylate are mixed thoroughly and stripped with an oil pump at room temperature. Then 20 parts L-45 silicone fluid (Union Carbide), and 283.5 parts magnox black 3525 (Hercules) are added. The mixture is ball milled until homogenous. Then 80 parts of Benzoin isobutyl ether are added.

Films of 0.4 mil thickness are applied to the resultant substrates with a wire wound coating rod onto paper, aluminum foil, vinyl-coated aluminum foil, mylar, glass, and steel. The coated substrates are exposed for 1/10 second to the U.V. radiation given off by a medium pressure mercury vapor lamp (Hanovia 200 w/inch) at the distance of 5 inches from the lamp. This distance coincides with the second focal point created by the elliptical reflector.

After this exposure, all samples are dry to the touch but are scratched readily with one's fingernail.

Left to stand at room temperature, after 24 hours the coatings are tested again. The pencil hardness has increased to 3H, the abrasion resistance has improved, and the films are not affected by hand rubbing with methyl ethyl ketone as the solvent.

EXAMPLE 33

312 parts acrylic polymer with oxazolidine side chains (Rohm & Haas QR-568; 1.0 equivalent active hydrogen), 163 parts product of Example 14 (acrylated bisglycidyl ether of bisphenol A reacted with 2 moles isophorone diisocyanate; 0.33 equivalent isocyanate), 115.7 parts product of Example 18 (2-hydroxyethyl acrylate reacted with isophorone diisocyanate, 0.33 equivalent isocyanate), 392 parts product of Example 9 [isophorone diisocyanate reacted with poly (propylene oxide) triol (Dow Voranol 2070, hydroxyl No. 229) and then with 2-hydroxy ethyl acrylate; 0.33 equivalent isocyanate], 8 Halocarbon oil 437 (Halocarbon Products Corp.), 100 parts 1,6-hexanediol diacrylate are mixed thoroughly and stripped with an oil pump at room temperature. Then 20 parts L-45 silicone fluid (Union Carbide), and 397 parts magnox black 3525 (Hercules) are added. The mixture is ball milled until homogenous. Then 80 parts of Sandoray 1000 (U.V.-sensitizer by Sandoz Chem. Inc.) are added to the mixture.

Films of 0.4 mil thickness are applied to the resultant substrates with a wire wound coating rod onto paper, aluminum foil, vinyl-coated aluminum foil, mylar, glass, and steel. The coated substrates are exposed for 1/10 second to the U.V. radiation given off by a medium pressure mercury vapor lamp (Hanovia 200 w/inch) at the distance of 5 inches from the lamp. This distance coincides with the second focal point created by the elliptical reflector.

After this exposure, all samples are dry to the touch, but are scratched readily with one's fingernail.

Left to stand at room temperature, after 24 hours the coatings are tested again. The pencil hardness has increased to 3H, the abrasion resistance has improved, and the films resist hand rubbing up to 40 times using methyl ethyl ketone as the solvent.

EXAMPLE 34

312 parts acrylic polymer with oxazolidine side chains (Rohm & Haas QR-568; 1.0 equivalent active hydrogen), 163 parts product of Example 14 (acrylated bisglycidyl ether of bisphenol A reacted with 2 moles isophorone diisocyanate; 0.33 equivalent isocyanate), 129.4 parts product of Example 16 (2-hydroxyethyl acrylate reacted with 4,4'-dicyclohexyl methane diisocyanate, 0.33 equivalent isocyanate), 363.7 parts product of Example 10 [1,6-hexane diisocyanate reacted with poly (propylene oxide) triol (Dow Voranol 2070, hydroxyl No. 229) and then with 2-hydroxy ethyl acrylate; 0.33 equivalent isocyanate]; 8 parts stearyl acrylate, 100 parts 1,6-hexanediol diacrylate are mixed thoroughly and stripped with an oil pump at room temperature. Then 20 parts L-45 silicone fluid (Union Carbide), and 510 parts magnox black 3525 (Hercules) are added. The mixture is ball milled until homogenous. Then 100 parts of Irgacure 651 (U.V.-sensitizer by Ciba-Geigy Corp.) are added to the mixture.

Films of 0.4 mil thickness are aplied to the resultant substrates with a wire wound coating rod onto paper, aluminum foil, vinyl-coated aluminum foil, mylar, glass, and steel. The coated substrates are exposed for one-fifth second to the U.V. radiation given off by a medium pressure mercury vapor lamp (Hanovia 200 w/inch at the distance of 5 inches from the lamp. This distance coincides with the second focal point created by the elliptical reflector.

After this exposure, all samples are dry to the touch but are scratched readily with one's fingernail.

Left to stand at room temperature, after 24 hours the coatings are tested again. The pencil hardness has increased to 3H, the abrasion resistance has improved, and the films resist hand rubbing of at least 40 times using methyl ethyl ketone as the solvent.

EXAMPLE 35

312 parts acrylic polymer with oxazolidine side chains (Rohm & Haas QR-568; 1.0 equivalent active hydrogen), 177 parts product of Example 12 (acrylated bisglycidyl ether of bisphenol A reacted with 2 moles 4,4'-dicyclohexyl methane diisocyanate; 0.33 equivalent isocyanate), 129.4 parts product of Example 16 (2-hydroxyethyl acrylate reacted with 4,4'-dicyclohexyl methane diisocyanate, 0.33 equivalent isocyanate), 412 parts product of Example 3 [4,4'-dicyclohexyl methane diisocyanate reacted with poly (propylene oxide) triol (Dow Voranol 2070, hydroxyl No. 229) and then with 2-hydroxy ethyl acrylate; 0.33 equivalent isocyanate]; 8 parts stearyl acrylate, 100 parts 1,6-hexanediol diacrylate are mixed thoroughly and stripped with an oil pump at room temperature. Then 20 parts L-45 silicone fluid (Union Carbide), and 227 parts Primrose Yellow (Hercules) are added. The mixture is ball milled until homogenous. Then a mixture of 20 parts of Benzoin isobutyl ether, 25 parts of Sandoray 1000, and 20 parts of Irgacure 651 are added to the mixture.

Films of 0.4 mil thickness are applied to the resultant substrates with a wire wound coating rod onto paper, aluminum foil, vinyl-coated aluminum foil, mylar, glass, and steel. The coated substrates are exposed for 1/10 second to the U.V. radiation given off by a medium pressure mercury vapor lamp (Hanovia 200 w/inch) at the distance of 5 inches from the lamp. This distance coincides with the second focal point created by the elliptical reflector.

After this exposure, all samples are dry to the touch but are scratched readily with one's fingernail.

Left to stand at room temperature, after 24 hours the coatings are tested again. The pencil hardness has increased to 3H, the abrasion resistance has improved, and the films resist hand rubbing of at least 40 times using methyl ethyl ketone as the solvent.

EXAMPLE 36

312 parts acrylic polymer with oxazolidine side chains (Rohm & Haas QR-568; 1.0 equivalent active hydrogen), 163 parts product of Example 14 (acrylated bisglycidyl ether of bisphenol A reacted with 2 moles isophorone diisocyanate; 0.33 equivalent isocyanate), 115.7 parts product of Example 18 (2-hydroxyethyl acrylate reacted with isophorone diisocyanate, 0.33 equivalent isocyanate), 392 parts product of Example 9 [isophorone diisocyanate reacted with poly (propylene oxide) triol (Dow Voranol 2070, hydroxyl No. 229) and then with 2-hydroxy ethyl acrylate; 0.33 equivalent isocyanate]; 8 parts stearyl acrylate, 100 parts 1,6-hexanediol diacrylate are mixed thoroughly and stripped with an oil pump at room temperature. Then 20 parts L-45 silicone fluid (Union Carbide), and 350 parts titanium dioxide (DuPont) are added. The mixture is ball milled until homogenous. Then 80 parts of Benzoin isobutyl ether are added to the mixture.

Films of 0.4 mil thickness are applied to the substrates with a wire wound coating rod onto paper, aluminum foil, vinyl-coated aluminum foil, mylar, glass, and steel. The coated substrates are exposed for one-fifth second to the U.V. radiation given off by a medium pressure mercury vapor lamp (Hanovia 200 w/inch) at the distance of 5 inches from the lamp. This distance coincides with the second focal point created by the elliptical reflector.

After this exposure, all samples are dry to the touch but are scratched readily with one's fingernail.

Left to stand at room temperature, after 24 hours the coatings are tested again. The pencil hardness has increased to 3H, the abrasion resistance has improved, and the films resist hand rubbing over 40 times using methyl ethyl ketone as the solvent.

EXAMPLE 37

312 parts acrylic polymer with oxazolidine side chains (Rohm & Haas QR-568, 1.0 equivalent active hydrogen), 117 parts product of Example 24 [polyisocyanate of 1,6-hexane diisocyanate (Desmodur N-100, Mobay Chemical) partly reacted with 2-hydroxyethyl acrylate; 0.33 equivalent isocyanate]; 162.7 parts product of Example 14 (acrylated bisglycidol ether of bisphenol A reacted with isophorone diisocyanate, 0.33 equivalent isocyanate), 97.2 parts product of Example 17 (1,6-hexane diisocyanate reacted with 2-hydroxyethyl acrylate; 0.33 equivalent isocyanate), 100 parts neo-pentyl glycol diacrylate and 10 parts stearyl acrylate are mixed thoroughly and stripped with an oil pump at room temperature. Then 2 parts Silane A 174 (Union Carbide), and 60 parts Benzoin isobutyl ether are added. The mixture is ball milled until homogenous.

Films of 0.4 mil thickness are applied to the resultant substrates with a wire wound coating rod onto paper, aluminum foil, vinyl-coated aluminum foil, mylar, glass, and steel. The coated substrates are exposed for 1/10 second to the U.V. radiation given off by a medium pressure mercury vapor lamp (Hanovia 200 w/inch) at the distance of 5 inches from the lamp. This distance coincides with the second focal point created by the elliptical reflector.

After this exposure, all samples are dry to the touch, but are scratched very easily with one's fingernail.

Left to stand at room temperature, after 24 hours the coatings are tested again. The pencil hardness has increased to 3H, the abrasion has improved and the film is resistant to at least 40 hand rubs, using methyl ethyl ketone as the solvent.

EXAMPLE 38

312 parts acrylic polymer with oxazolidine side chains (Rohm & Haas QR-568, 1.0 equivalent active hydrogen), 117 parts product of Example 24 [polyisocyanate of 1,6-hexane diisocyanate (Desmodur N-100, Mobay Chemical) reacted with 2-hydroxyethyl acrylate; 0.33 equivalent isocyanate], 162.7 parts product of Example 14 (acrylated bisglycidyl ether of bisphenol A reacted with isophorone diisocyanate, 0.33 equivalent isocyanate), 97.2 parts product of Example 17 (1,6-hexane diisocyanate reacted with 2-hydroxyethyl acrylate; 0.33 equivalent isocyanate), 100 parts neo-pentyl glycol diacrylate and 10 cyclododecane are mixed thoroughly and stripped with an oil pump at room temperature. Then 2 parts Silane A 174 (Union Carbide), and 361 parts Magnox Black 3525 (Hercules) are added. The mixture is ball milled until homogenous. Then 60 parts Benzoin isobutyl ether are added to the mixture.

Films of 0.4 mil thickness are applied to the resultant substrates with a wire wound coating rod onto paper, aluminum foil, vinyl-coated aluminum foil, mylar, glass, and steel. The coated substrates are exposed for 1/10 second to the U.V. radiation given off by a medium pressure mercury vapor lamp (Hanovia 200 w/inch) at the distance of 5 inches from the lamp. This distance coincides with the second focal point created by the elliptical reflector.

After this exposure, all samples are dry to the touch, but are scratched very easily with one's fingernail.

Left to stand at room temperature, after 24 hours the coatings are tested again. The pencil hardness has increased to 3H; the abrasion has improved and the film is resistant to at least 40 hand rubs, using methyl ethyl ketone as the solvent.

EXAMPLE 39

312 parts acrylic polymer with oxazolidine side chains (Rohm & Haas QR-568, 1.0 equivalent active hydrogen), 117 parts product of Example 24 [polyisocyanate of 1,6-hexane diisocyanate (Desmodur N-100, Mobay Chemical) reacted with 2-hydroxyethyl acrylate; 0.33 equivalent isocyanate], 162.7 parts product of Example 14 (acrylated bisglycidyl ether of bisphenol A reacted with isophorone diisocyanate, 0.33 equivalent isocyanate), 115.7 parts product of Example 18 (isophorone diisocyanate reacted with 2-hydroxyethyl acrylate; 0.33 equivalent isocyanate), 100 parts neo-pentyl glycol diacrylate and 10 parts stearyl acrylate are mixed thoroughly and stripped with an oil pump at room temperature. Then 2 parts Silane A 174 (Union Carbide), and 464 parts Magnox Black 3525 (Hercules) are added to the mixture. The entire composition is ball milled until homogenous. Then 60 parts Sandoray 1000 are added to the composition.

Films of 0.4 mil thickness are applied to the resultant substrates with a wire wound coating rod onto paper, aluminum foil, vinyl-coated aluminum foil, mylar, glass, and steel. The coated substrates are exposed for one-fifth second to the U.V. radiation given off by a medium pressure mercury vapor lamp (Hanovia 200 2/inch) at the distance of 5 inches from the lamp. This distance coincides with the second focal point created by the elliptical reflector.

After this exposure, all samples are dry to the touch, but are scratched very easily with one's fingernail.

Left to stand at room temperature, after 24 hours the coatings are tested again. The pencil hardness has increased to 3H; the abrasion has improved and the film is resistant to at least 40 hand rubs, using methyl ethyl ketone as the solvent.

EXAMPLE 40

312 parts acrylic polymer with oxazolidine side chains (Rohm & Haas QR-568, 1.0 equivalent active hydrogen), 117 parts product of Example 24 (polyisocyanate of 1,6-hexane diisocyanate (Desmodur N-100, Mobay Chemical) reacted with 2-hydroxyethyl acrylate; 0.33 equivalent isocyanate), 115.7 parts product of Example 18 isophorone diisocyanate reacted with 2-hydroxyethyl acrylate; 0.33 equivalent isocyanate), 100 parts neo-pentyl glycol diacrylate and 10 parts stearyl acrylate are mixed thoroughly and stripped with an oil pump at room temperature. Then 2 parts Silane A 174 (Union Carbide), and 361 parts titanium dioxide (DuPont) are added. The mixture is ball milled until homogenous. Then 60 parts Irgacure 651 are added to the mixture.

Films of 0.4 mil thickness are applied to the resultant substrates with a wire wound coating rod onto paper, aluminum foil, vinyl-coated aluminum foil, mylar, glass, and steel. The coated substrates are exposed for 1/10 second to the U.V. radiation given off by a medium pressure mercury vapor lamp (Hanovia 200 w/inch) at the distance of 5 inches from the lamp. This distance coincides with the second focal point created by the elliptical reflector.

After this exposure, all samples are dry to the touch, but are scratched readily with one's fingernail.

Left to stand at room temperature, after 24 hours the coatings are tested again. The pencil hardness has increased to 3H; the abrasion has improved and the film is resistant to at least 40 rubs, using methyl ethyl ketone as the solvent.

EXAMPLE 41

312 parts acrylic polymer with oxazolidine side chains (Rohm & Haas QR-568, 1.0 equivalent active hydrogen), 285.7 parts product of Example 21 [polyisocyanate of toluene diisocyanate in butyl acetate (Desmodur IL, Mobay Chemical) reacted with 2-hydroxyethyl acrylate; 0.33 equivalent isocyanate], 162.7 parts product of Example 14 (acrylated bisglycidyl ether of bisphenol A reacted with isophorone diisocyanate, 0.33 equivalent isocyanate), 99.3 parts product of Example 15 (2.4-toluene diisocyanate reacted with 2-hydroxyethyl acrylate; 0.33 equivalent isocyanate), 100 parts neo-pentyl glycol diacrylate and 10 parts stearyl acrylate are mixed thoroughly and stripped with an oil pump at room temperature. Then 2 parts Silane A 174 (Union Carbide), and 464 parts titanium dioxide (Hercules) are added. The mixture is ball milled until homogenous. Then 60 parts Benzoin isobutyl ether are added to the mixture.

Films of 0.4 mil thickness are applied to the resultant substrate with a wire wound coating rod onto paper, aluminum foil, vinyl-coated aluminum foil, mylar, glass and steel. The coated substrates are exposed for 1/10 second to the U.V. radiation given off by a medium pressure mercury vapor lamp (Hanovia 200 w/inch) at the distance of 5 inches from the lamp. This distance coincides with the second focal point created by the elliptical reflector.

After this exposure, all samples are dry to the touch, but are scratched readily with one's fingernail.

Left to stand at room temperature, after 24 hours the coatings are tested again. The pencil hardness has increased to 3H; the abrasion has improved and the film is resistant to at least 40 hand rubs, using methyl ethyl ketone as the solvent.

EXAMPLE 42

767 parts acrylic polymer with oxazolidine side chains (Rohm & Haas ZR-113M; 1.0 equivalent active hydrogen), 337 parts product of Example 5 [isophorone diisocyanate reacted with poly (propylene oxide) triol (Dow Voranol CP 260, hydroxyl No. 653) and with 2-hydroxyethyl acrylate; 0.33 equivalent isocyanate], 121 parts product of Example 16 (4,4'-dicyclohexyl methane diisocyanate reacted with 2-hydroxyethyl acrylate; 0.33 equivalent isocyanate), 117.7 parts product of Example 24 [polyfunctional aliphatic isocyanate (Desmodur N-100, Mobay Chemical) reacted with 2-hydroxyethyl acrylate; 0.33 equivalent isocyanate], 50 parts 1,6-hexanediol diacrylate, and 9 parts stearyl acrylate are mixed thoroughly and stripped with an oil pump at room temperature. Then 5 parts Silane A-171 (Union Carbide) and 360.5 parts titanium dioxide are added. The mixture is ball milled until homogenous. Then 60 parts Sandoray 1000 (Sandoz Chemical, Inc.) are added to the mixture.

Films of 0.4 mil thickness are applied to the resultant substrates with a wire wound coating rod onto paper, aluminum foil, vinyl-coated aluminum foil, mylar, glass, and steel. The coated substrates are exposed for 1/10 second to the U.V. radiation given off by a medium pressure mercury vapor lamp (Hanovia 200 w/inch) at the distance of 5 inches from the lamp. This distance coincides with the second focal point created by the elliptical reflector.

After this exposure all samples are dry to the touch, but are scratched readily with one's fingernail.

Upon standing at room temperature for 24 hours, the samples are tested. The pencil hardness has increased to 3H, the abrasion has improved, and using methyl ethyl ketone as a solvent the coating stood up to more than 40 hand rubs.

EXAMPLE 43

767 parts acrylic polymer with oxazolidine side chains (Rohm & Haas ZR-113M; 1.0 equivalent active hydrogen), 337 parts product of Example 5 [isophorone diisocyanate reacted with poly (propylene oxide) triol (Dow Voranol CP 260, hydroxyl No. 653) and with 2-hydroxyethyl acrylate; 0.33 equivalent isocyanate], 121 parts product of Example 16 (4,4'-dicyclohexyl methane diisocyanate reacted with 2-hydroxyethyl acrylate; 0.33 equivalent isocyanate), 117.7 parts product of Example 24 [polyfunctional aliphatic isocyanate (Desmodur N-100, Mobay Chemical) reacted with 2-hydroxyethyl acrylate; 0.33 equivalent isocyanate], 50 parts 1,6-hexanediol diacrylate, and 9 parts stearyl acrylate are mixed thoroughly and stripped with an oil pump at room temperature. Then 5 parts Silane A-171 (Union Carbide) and 50 parts Irgacure 651 are added. The mixture is ball milled until homogenous.

Films of 0.4 mil thickness are applied to the resultant substrates with a wire wound coating rod onto paper, aluminum foil, vinyl-coated aluminum foil, mylar, glass, and steel. The coated substrates are exposed for 1/10 second to the U.V. radiation given off by a medium pressure mercury vapor lamp (Hanovia 200 w-inch) at the distance of 5 inches from the lamp. This distance coincides with the second focal point created by the elliptical reflector.

After this exposure all samples are dry to the touch, but are scratched readily with one's fingernail.

Upon standing at room temperature for 24 hours, the samples are tested. The pencil hardness has increased to 3H, the abrasion has improved, and using methyl ethyl ketone as a solvent, the coating stood up to more than 40 hand rubs.

EXAMPLE 44

263.8 parts oxazolidine terminated polyurethane [made from 710 parts polyether triol (Dow Voranol 2070), 666 parts isophorone diisocyanate, and 351 parts N-hydroxyethyl oxazolidine (1.0 equivalent active hydrogen], 334.4 parts product of Example 12 (acrylated bisglycidyl ether of bisphenol A, reacted with 2 moles 4,4'-dicyclohexyl methane diisocyanate; 0.63 equivalent isocyanate), 143.4 parts product of Example 16 (2-hydroxyethyl acrylate reacted with 4,4'-dicyclohexyl methane diisocyanate, 0.37 equivalent isocyanate), 300 parts 1,6-hexanediol diacrylate, and 10.0 parts stearyl acrylate are mixed thoroughly and stripped with an oil pump at room temperature. Then 25.0 parts L-45 silicone fluid (Union Carbide) and 30.0 parts Benzoin isobutyl ether are added and mixed thoroughly.

Films of 0.4 mil thickness are applied to the resultant substrates with a wire wound coated rod onto paper, aluminum foil, vinyl-coated aluminum foil, mylar, glass, and steel. The coated substrates are exposed for 1/10 second to U.V. radiation given off by a medium pressure mercury vapor lamp (Hanovia 200 w/inch) at a distance of 5 inches from the lamp. This distance coincides with the second focal point created by the elliptical reflector.

After this exposure, all samples are dry to the touch, but are readily scratched with one's fingernail.

The samples are kept at room temperature. After 24 hours, the pencil hardness has increased to 3H, and the coatings have a rub resistance of more than 40 hand rubs, using methyl ethyl ketone as the solvent.

EXAMPLE 45

263.8 parts oxazolidine terminated polyurethane [made from 710 parts polyether triol (Dow Voranol 2070), 666 parts isophorone diisocyanate, and 351 parts N-hydroxyethyl oxazolidine (1.0 equivalent active hydrogen], 334.4 parts product of Example 12 (acrylated bisglycidyl ether of bisphenol A, reacted with 2 moles 4,4'-dicyclohexyl methane diisocyanate; 0.63 equivalent isocyanate), 143.4 parts product of Example 16 (2-hydroxyethyl acrylate reacted with 4,4'-dicyclohexyl methane diisocyanate, 0.37 equivalent isocyanate), 300 parts 1,6-hexanediol diacrylate, and 10.0 parts stearyl acrylate are mixed thoroughly and stripped with an oil pump at room temperature. Then 25.0 parts L-45 silicone fluid (Union Carbide) and 510 part Wayne Red Toner (Hercules) are added. The mixture is ball milled until homogenous. Then 30.0 parts Benzoin isobutyl ether is added.

Films of 0.4 mil thickness are applied to the resultant substrates with a wire wound coating rod onto paper, aluminum foil, vinyl-coated aluminum foil, mylar, glass, and steel. The coated substrates are exposed for 1/10 second to U.V. radiation given off by a medium pressure mercury vapor lamp (Hanovia 200 w/inch) at a distance of 5 inches from the lamp. This distance coincides with the second focal point created by the elliptical reflector.

After this exposure, all samples are dry to the touch, but are readily scratched with one's fingernail.

The samples are kept at room temperature. After 24 hours, the pencil hardness has increased to 3H, and the coatings have a rub resistance of more than 40 hand rubs, using methyl ethyl ketone as the solvent.

EXAMPLE 46

306.5 parts of oxazolidine terminated polyester [made from 134 parts trimethylolpropane, 584 parts adipic acid and 248 parts ethylene glycol reacted with 666 parts isophorone diisocyanate and 351 parts N-hydroxyethyl oxazolidine (1.0 equivalent active hydrogen], 117 parts product of Example 24 [N,N',N''-tris (6-isocyanatohexamethylene) diisocyanate (Desmodur N-100, Mobay Chemical) reacted with 2-hydroxyethyl acrylate; 0.33 equivalent isocyanate], 162.7 parts product of Example 14 (acrylated bisglycidyl ether of bisphenol A reacted with isophorone diisocyanate, 0.33 equivalent isocyanate), 115.7 parts product of Example 18 (isophorone diisocyanate reacted with 2-hydroxyethyl acrylate; 0.33 equivalent isocyanate), 100 parts neopentyl glycol diacrylate and 10 parts stearyl acrylate are mixed thoroughly and stripped with an oil pump at room temperature. Then 2 parts Silane A-174 (Union Carbide), and 60 parts Benzoin isobutyl ether are added. The mixture is ball milled until homogenous.

Films of 0.4 mil thickness are applied to the resultant substrates with a wire wound coating rod onto paper, aluminum foil, vinyl-coated aluminum foil, mylar, glass, and steel. The coated substrates are exposed for 1/10 second to the U.V. radiation given off by a medium pressure mercury vapor lamp (Hanovia 200 w/inch) at the distance of 5 inches from the lamp. This distance coincides with the second focal point created by the elliptical reflector.

After this exposure, all samples are dry to the touch, but are readily scratched with one's fingernail.

Left to stand at room temperature, after 24 hours the coatings are tested again. The pencil hardness has increased to 3H, the abrasion has improved and the film is resistant to at least 40 hand rubs, using methyl ethyl ketone as the solvent.

EXAMPLE 47

306.5 parts oxazolidine terminated polyester [made from 134 parts trimethylolpropane, 584 parts adipic acid and 248 parts ethylene glycol reacted with 666 parts isophorone diisocyanate and 351 parts N-hydroxyethyl oxazolidine (1.0 equivalent active hydrogen], 117 parts product of Example 24 [N,N',N''-tris (6-isocyanatohexamethylene) diisocyanate (Desmodur N-100, Mobay Chemical) reacted with 2-hydroxyethyl acrylate; 0.33 equivalent isocyanate], 162.7 parts product of Example 14 (acrylated bisglycidyl ether of bisphenol A reacted with isophorone diisocyanate, 0.33 equivalent isocyanate), 115.7 parts product of Example 18 (isophorone diisocyanate reacted with 2-hydroxyethyl acrylate; 0.33 equivalent isocyanate), 100 parts neopentyl glycol diacrylate and 10 parts stearyl acrylate are mixed thoroughly and stripped with an oil pump at room temperature. Then 2 parts Silane A-174 (Union Carbide), and 361 parts titanium dioxide are added. The mixture is ball milled until homogenous. Then 60 parts Benzoin isobutyl ether is added to the mixture.

Films of 0.4 mil thickness are applied to the resultant substrates with a wire wound coating rod onto paper, aluminum foil, vinyl-coated aluminum foil, mylar, glass, and steel. The coated substrates are exposed for 1/10 second to the U.V. radiation given off by a medium pressure mercury vapor lamp (Hanovia 200 w/inch) at the distance of 5 inches from the lamp. This distance coincides with the second focal point created by the elliptical reflector.

After this exposure, all samples are dry to the touch, but are readily scratched with one's fingernail.

Left to stand at room temperature, after 24 hours the coatings are tested again. The pencil hardness has increased to 3H, the abrasion has improved and the film is resistant to at least 40 hand rubs, using methyl ethyl ketone as the solvent.

EXAMPLE 48

306.5 parts oxazolidine terminated polyester [made from 134 parts trimethylolpropane, 584 parts adipic acid and 248 parts ethylene glycol reacted with 666 parts isophorone diisocyanate and 351 parts N-hydroxyethyl oxazolidine (1.0 equivalent active hydrogen], 117 parts product of Example 24 [N,N',N''-tris (6-isocyanatohexamethylene) diisocyanate (Desmodur N-100, Mobay Chemical) reacted with 2-hydroxyethyl acrylate; 0.33 equivalent isocyanate], 162.7 parts product of Example 14 (acrylated bisglycidyl ether of bisphenol A reacted with isophorone diisocyanate, 0.33 equivalent isocyanate), 115.7 parts product of Example 18 (isophorone diisocyanate reacted with 2-hydroxyethyl acrylate; 0.33 equivalent isocyanate), 100 parts neopentyl glycol diacrylate and 10 parts cyclododecane are mixed thoroughly and stripped with an oil pump at room temperature. Then 2 parts Silane A-174 (Union Carbide), and 360 parts Magnox Black 3525 (Hercules) are added. The mixture is ball milled until homogeneous. Then 60 parts Sandoray 1000 are added to the entire mixture.

Films of 0.4 mil thickness are applied to the resultant substrates with a wire wound coating rod onto paper, aluminum foil, vinyl-coated aluminum foil, mylar, glass, and steel. The coated substrates are exposed for 1/10 second to the U.V. radiation given off by a medium pressure vapor lamp (Hanovia 200 w/inch) at the distance of 5 inches from the lamp. This distance coincides with the second focal point created by the elliptical reflector.

After this exposure, all samples are dry to the touch, but are readily scratched with one's fingernail.

Left to stand at room temperature, after 24 hours the coatings are tested again. The pencil hardness has increased to 3H; the abrasion has improved and the film is resistant to at least 40 hand rubs, using methyl ethyl ketone as the solvent.

EXAMPLE 49

767 parts acrylic polymer with oxazolidine side chains (Rohm & Haas ZR-113M; 1.0 equivalent active hydrogen), 337.2 parts product of Example 5 [isophorone diisocyanate reacted with poly (propylene oxide) triol (Dow Voranol CP 260, hydroxyl No. 653) reacted with 2-hydroxyethyl acrylate], 121 parts product of Example 16 (4,4'-dicyclohexyl methane diisocyanate reacted with 2-hydroxyethyl acrylate), 117.7 parts product of Example 24 [polyfunctional aliphatic isocyanate (Desmodur N-100, Mobay Chemical) reacted with 2-hydroxyethyl acrylate], 50 parts 1,6-hexanediol diacrylate and 9 parts stearyl acrylate are mixed thoroughly and stripped with an oil pump at room temperature. Then 5 parts Silane A-171 (Union Carbide) and 60 parts Benzoin isobutyl ether are added.

Films of 0.035 to 0.040 inch thickness are applied onto a glass plate. The film is allowed to cure at room temperature in the open air for 4 hours. During this time, the film becomes tack-free.

A line process negative is placed in ultimate contact with the film. The assembly is then exposed to U.V. radiation for several seconds. After removal of the negative, the layer in the unexposed areas is removed by washing with methyl isobutyl ketone. The resultant relief image of the text of the negative has excellent sharpness and deep recess areas and is suitable for direct use as a printing relief.

EXAMPLE 50

312 parts acrylic polymer with oxazolidine side chains (Rohm & Haas QR-568; 1.0 equivalent active hydrogen), 272 parts product of Example 13 (acrylated bisglycidyl ether of bisphenol A, reacted with 2 moles 1,6-hexane diisocyanate; 0.63 equivalent isocyanate), 107.7 parts product of Example 17 (2-hydroxyethyl acrylate reacted with 1,6-hexane diisocyanate; 0.37 equivalent isocyanate), 300 parts 1,6-hexanediol diacrylate, and 10.0 parts stearyl acrylate are mixed thoroughly and stripped with an oil pump at room temperature. Then 25.0 parts L-45 Silicone fluid (Union Carbide) and 510 parts Wayne Red Toner (Hercules) are added. The mixture is ball milled until homogenous. Then 40.0 parts Irgacure 651 is added to the mixture.

Films of 0.4 mil thickness are applied with a wire wound coating rod onto metallized mylar with pressure sensitive backing. The film is allowed to dry to the touch at room temperature.

The label is made by placing a negative in intimate contact with the film. The assembly is then exposed to U.V. radiation for several seconds. After removal of the negative, the layer in the unexposed areas is removed by washing with methyl ethyl ketone. The resultant relief image has excellent sharpness and is suitable for direct use as a label.

As exemplified in the foregoing Examples, the compositions of the present invention preferably comprise by weight about 0–60% pigment or other coloring material or filler; about 0–30% coating aids such as polymers, waxes, leveling agents, adhesion promoters and the like; and from about 30–100% reactive moisture and radiation polymerizable compounds, of which up to about 30% may comprise radiation curable monomer of low molecular weight, preferably acrylates. The monomers employed may have one or more ethylenically unsaturated functional groups and preferably include at least one polyfunctional monomer to promote cross-linking. Preferably the majority of the polymerization compounds by weight have radiation curable groups and the compositions include at least one liquid prepolymer combining an unsaturated radiation curable group with an isocyanate or oxazolidine group. For use with ultraviolet light, a photosensitizer is included.

The compositions are liquids having a composite viscosity suitable for coating or printing, generally less than about 1000 cps at room temperature, and are preferably free or substantially free of inert (non-reactive) volatile solvent. While all the reactive compounds are preferably liquids, some of them may be solids dispersed and preferably dissolved in the other liquids employed.

Most preferred are compositions comprising a solution of two liquid prepolymers in liquid monomer, the first prepolymer having at least one ethylenically unsaturated group copolymerizable by radiation with said monomer and at least one isocyanate or oxazolidine group; the second prepolymer having at least two reactive groups one of which is the other of said isocyanate or oxazolidine group and the second reactive group is an isocyanate, oxazolidine, or unsaturated group copolymerizable with said monomer. The reactive groups described may be attached, preferably as end groups, to any organic radical suitable for forming coatings and many suitable radicals are known in the literature and are illustrated in the above description and Examples. For many purposes, Example 26 is currently preferred although the specific formulation and Example best employed for a specific application is dependent on the substrate being coated or printed and the end properties desired.

It should be understood that the foregoing description and Examples are for the purpose of illustration and that the invention includes all equivalents and modifications within the scope of the appended claims.

What is claimed is:

1. A radiation curable coating composition which comprises a compound containing both radiation curable and moisture curable reaction groups, said composition also containing both an isocyanate and an oxazolidine.

2. The composition according to claim 1 wherein said reaction groups comprise isocyanates and oxazolidines, said oxazolidines having the formula:

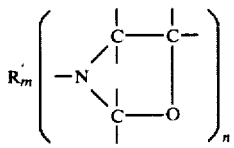

wherein "R'" represents a radiation-curable monomeric or polymeric radical containing ethylenic unsaturation or a bivalent radical; "m" represents an integer from 1 to 4; and "n" represents an integer from 1 to 10.

3. The composition of claim 2 wherein "R'" is a bivalent radical.

4. The composition of claim 3 wherein the bivalent radical represents 2 oxazolidine rings.

5. The composition of claim 2 wherein "R'" is a monomer containing ethylenic unsaturation.

6. The composition of claim 2 wherein "R'" is a polymer containing ethylenic unsaturation.

7. The composition of claim 2 which further contains a filler material.

8. The composition according to claim 1 comprising pigment dispersed in a solution of acrylate monomer, a prepolymer terminated with at least one acrylate group and at least one isocyanate group and one oxazolidine group, said composition being substantially free of volatile, inert solvent.

9. The composition according to claim 8 which further contains a photosensitizer for ultraviolet radiation.

10. A method of coating or printing a substrate which comprises applying to said substrate a composition comprising a compound containing both radiation curable and moisture curable reaction groups, said composition also containing both an isocyanate and an oxazolidine and thereafter exposing said composition to radiation and to moisture.

11. The method of claim 10 which comprises exposing said composition to an amount of ultraviolet radiation effective to cure the surface thereof in order that said surface be substantially tack-free and thereafter exposing said composition to moisture.

12. The method of claim 10 wherein said reaction groups comprise isocyanates and oxazolidines, said oxazolidines having the formula:

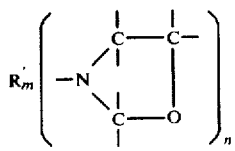

wherein "R'" represents a radiation-curable monomeric or polymeric radical containing ethylenic unsaturation or a bivalent radical; "m" represents an integer from 1 to 4; and "n" represents an integer from 1 to 10.

13. The method of claim 12 wherein "R'" is a bivalent radical.

14. The method of claim 13 wherein the bivalent radical represents 2 oxazolidine rings.

15. The method of claim 12 wherein "R'" is a monomer containing ethylenic unsaturation.

16. The method of claim 12 wherein "R'" is a polymer containing ethylenic unsaturation.

17. The method of claim 12 wherein the composition further contains a filler material.

18. The method of claim 10 wherein said composition contains coloring materials sufficient to restrict penetration of said radiation therethrough.

19. A method of providing a solid coating on a substrate in a predetermined pattern which comprises coating said substrate substantially in the absence of polymerizing radiation with a composition comprising radiation-curable materials and reaction groups which are stable in the absence of moisture, exposing said coating to moisture sufficient to provide a solid tack-free surface, exposing said surface to radiation in said predetermined pattern, and thereafter removing the unexposed portions of the coating.

20. The method of claim 19 wherein said composition contains both isocyanate and oxazolidine reaction groups, said oxazolidines having the formula:

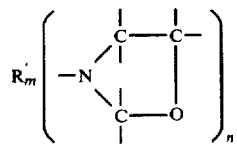

wherein "R'" represents a radiation-curable monomeric or polymeric radical containing ethylenic unsaturation or a bivalent radical; "m" represents an integer from 1 to 4; and "n" represents an integer from 1 to 10.

21. The method of claim 19 wherein said composition further contains a filler material.

22. The product of the process of claim 10.

23. The product of the process of claim 19.

24. A solid cross-linked polymeric coating on a substrate which comprises the polymerization product of a first prepolymer having at least one ethylenically unsaturated group and at least one isocyanate or oxazolidine group, and a second prepolymer having at least two reactive groups one of which is the other of said oxazolidine or isocyanate group reactive with said first prepolymer, the other reactive group on said second prepolymer being an isocyanate, oxazolidine or ethylenically unsaturated group, at least a portion of said unsaturated groups being polymerized by exposure to radiation and at least a portion of said isocyanate and oxazolidine groups being polymerized by exposure to moisture.

25. A cross-linked polymer on a substrate according to claim 17 wherein said prepolymers are liquid and wherein ethylenically unsaturated liquid monomer is copolymerized therewith.

* * * * *